Feb. 12, 1957        F. MATH        2,780,837
METHOD OF EMBEDDING METAL PROFILES IN CERAMIC MASSES
Filed Nov. 27, 1951
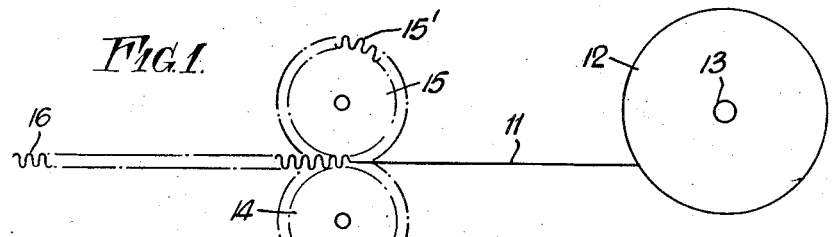
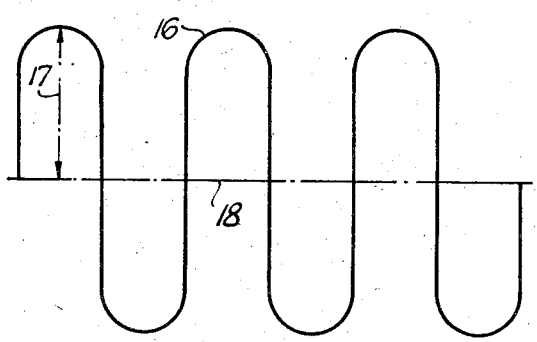
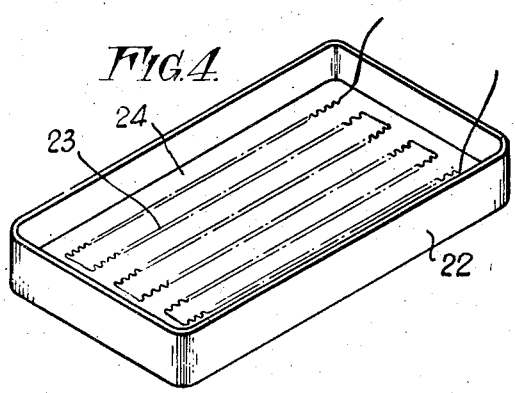
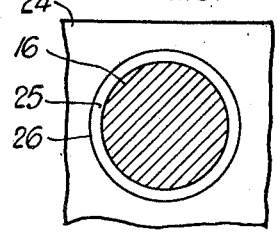
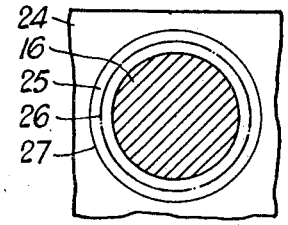
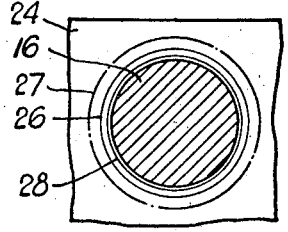
INVENTOR
FRITZ MATH
BY Klein + Hart
ATTORNEYS United States Patent Office 2,780,837
Patented Feb. 12, 1957

2,780,837

METHOD OF EMBEDDING METAL PROFILES IN CERAMIC MASSES

Fritz Math, Selb, Germany

Application November 27, 1951, Serial No. 258,473

5 Claims. (Cl. 18—59)

The present invention relates to a method of embedding elements made from metal or mixtures of metals with other substances, such as for example an electric hot wire filament or a mechanical reinforcing wire or an electrical resistor, in a ceramic body, this application being a continuation in part of my application Serial No. 216,667, filed March 20, 1951, which application has become abandoned.

Various different methods are already known which permit metal elements, e. g. in the form of wires, to be embedded or fused into ceramic bodies. All these methods however either depend on the use of an intermediate layer in the form of a ceramic mixture which compensates for the differences in expansion between the metal and the ceramic body, or aim at the highest possible degree of uniformity in the coefficients of thermal expansion of the materials used. These known methods in every case have the disadvantage that they either involve a very large number of working operations or necessitate the use of expensive materials, so that their utilisation in mass production is uneconomical.

The object of this invention is to provide a method which avoids this disadvantage while at the same time making due allowance for the shrinkage of the ceramic material which occurs during drying and firing and the expansion of the metallic element which occurs during firing, in such a manner as to prevent the setting up of stresses in the ceramic material of the finished product and the consequent liability for cracks to be produced in said material.

With this consideration in view, the improved method according to the present invention comprises the steps of coating the metallic element with a layer of a substance which is unstable at ceramic firing temperatures, embedding the coated element in ceramic slip or clay from which the ceramic body is to be formed and thereafter successively drying and firing the ceramic. In cases where the cross-sectional area of the element exceeds 0.2 sq. mm., the nature and thickness of said coating must be such that, on being brought into contact with the ceramic slip or clay it absorbs liquid therefrom and is thereby caused to expand, and that the shrinkage of the ceramic body which takes place during the drying operation is allowed for by the drying shrinkage of the coating and that the expansion of the element and further shrinkage of the ceramic body which takes place during firing are wholly absorbed due to the coating substance being at least partly dispersed at the firing temperature in the form for example of a gas, vapour or liquid, leaving a volumetric space which may in some cases contain a solid residue of smaller volume than the original coating.

The coating on the element advantageously consists of gelatine or collodion or mixtures of these two substances made up into the form of a nitrogen-base lacquer.

In order to allow for relative alterations in the lengths of the element and of the surrounding ceramic material, due to thermal expansion and shrinkage as in the case of the radial expansion and shrinkage already considered, the metallic element is preferably of an undulating shape before being embedded, and either before or after the application of the coating, so that it will yield elastically to accommodate these relative alterations in length.

While a solution of collodion has proved to be particularly suitable for use in accordance with this invention in the formation of a coating material for a metallic element, for instance a wire, which is to be embedded in a ceramic slab or like body, a considerable number of other substances have the necessary properties to enable them to be used for this purpose, i. e. they are transformed into gas or vapour or liquid or solid residue of smaller volume at, or preferably below, ceramic firing temperatures.

These alternative coating substances include some which are suitable for application to the metallic element by lacquering, others which lend themselves more readily to moulding around the element and yet others which are adapted to be used in the form of a strip, thread or filament which for example is wound on the said element or applied to it in the form of a woven fabric.

The main groupings into which the above-mentioned alternative coating substances fall are first natural and synthetic resins, second indiarubber and synthetic rubber-substitute materials, third lacquers and four substances which are applied as mentioned above in the form for example of a strip, filament or thread or as a fabric, to form an envelope.

The first group includes inter alia oleoresinous enamels based on natural resins, oleoresinous enamels based on synthetic resins and oil-free synthetic resinous enamels.

Examples of oleoresinous enamels based on natural resins include those based on or containing rosin, limed rosin, ester gum, copal, copal esters, bitumen, and pentaerythritol esters.

Examples of oleoresinous enamels based on synthetic resins include those based on or containing phenolic resins (100% and modified), cresylic resins (100% and modified), maleic resins, drying-oil modified alkyd resins, coumarone resins, and estern nut-shell liquid resins and cashew polymers.

Examples of oil-free synthetic resinous enamels include those based on or containing chemical substances generally known as "nylon" and polyamides, polyvinyl acetate, ethoxy resins, polyurethane, urea-formaldehyde, melamine formaldehyde, maleic resins, polystyrene and vinyl resins, polyesters, silicones, polytetrafluoroethylene, polytrifluorochloroethylene, alkyds, silicone alkyds, styrenated alkyds, cashew resins and polymers without drying oils, cellulose esters and their derivatives.

Other suitable synthetic resin and like plastic substances not already mentioned in these examples are casein, styrene (other than polystyrene), cellulose nitrate, acrylic resins, phenolic phenol-furfural, ethyl-cellulose, methyl-methacrylate resin, cellulose acetate, varnish resin, hydrocarbon resins of all kinds, and polyvinylamidin.

Typical examples of substances of the second group, i. e. indiarubbers and rubber-like materials, are natural rubber, neoprene, Thiocol, resistoflex, Pliolite, Perbunan, Koroseal, chemigum, Ameripol (all forms), pyroflex and rubber latex.

Substances of the third group, namely lacquers, include shellac, varnish, collodion (already referred to) and cellulose nitrate.

Substances of the fourth group i. e. substances applied in the form of a strip, filament or thread which is wound on the metallic element, include silk, cotton, linen, substances commonly known as "perlon" and "nylon," acetate silk, glass silk, paper and cellulose-xanthate (all forms).

In some cases the substance may be employed mixed with powdered metal or ceramic.

It has been found in practice that, when certain ceramic materials are used and more particularly those which have to be fired at a high temperature well above the average, there is a tendency for chemical reactions to take place during the firing which on the one hand corrode or otherwise damage the metallic element and on the other hand discolour the finished ceramic slab or the like. This difficulty can, however, be overcome by admixing a protective substance, e. g. graphite, with the coating substance or applying such a substance around the element in the form of a separate protective layer.

The invention will now be described by way of example with reference to the accompanying drawings as applied to the embedding of a metal wire heating element in a slab of ceramic material in the manufacture of an electric hot-plate.

In the drawings:

Figure 1 is a diagrammatic side elevation illustrating means employed for corrugating the metal wire, Figure 2 shows a short length of wire on an enlarged scale after it has been corrugated, Figure 3 is a diagram illustrating the passage of the metal wire through a bath containing a solution of the substance with which it is required to be coated.

Figure 4 is a perspective view showing the corrugated and coated metal wire after having been placed in position over a quantity of ceramic slip in a mould and before being covered by a quantity of further slip being poured over it.

Figures 5 to 7 illustrate the coated wire during successive subsequent stages.

Referring to Figure 1, plain metal wire 11 of 0.5 mm. diameter circular cross-section and composed of an aluminum iron alloy, known commercially as Kanthal, containing Al, 4%; Cr, 27%; Co, 1% and Fe, 68% is withdrawn from a reel 12 supported on an axle 13 and is passed between a pair of positively driven toothed wheels 14, 15. The teeth 14', 15' of wheels 14, 15 are long, loosely intermeshing teeth which are so shaped and dimensioned that the wire issuing from between them is bent into undulating form as shown at 16.

Figure 2 shows a 20 mm. length of the wire 16, and it will be seen that this 20 mm. length includes three complete waves. The amplitude 17 of the wave crests measured from a mean centre line 18 passing through the waves is 6 mm.

After the required length of wire has been bent into the form shown in Figure 2, it is coated with collodion and gelatine mixed in the ratio 2:1 by volume and dissolved in acetone, by passing it through a bath of this solution as shown diagrammatically in Figure 3, in which references 19 and 20 designate the solution and the bath respectively. The speed at which the wire 16 is passed through the solution 19 in the bath 20 is adjusted so as to ensure the formation on the wire of a coating of such a thickness that its cross-sectional area will be equal to between 8% and 10% of that of the wire. The coating is then allowed to dry.

The embedding of the wire elements in the ceramic material is then effected as follows. A quantity of prepared slip is poured into a mould 22 in accordance with established pottery practice. Next, as soon as the ceramic slab has attained approximately half the thickness required for the finished hotplate, the excess slip is poured out of the mould and a wire heating element 23 (Figure 4), made by bending the corrugated and coated wire 16 into an appropriate zig-zag shape, is pressed into the surface of the ceramic material 24 left in the mould. The remaining slip is then poured into the mould 22 until the slab attains the full required thickness and is ready for drying and firing in accordance with established pottery practice.

The effect on the wire 16, on the coating 25 surrounding the wire and on the ceramic material 24 of the successive operations described above is illustrated in the comparative diagrams of Figures 5 to 7, which diagrams are purely illustrative and are not drawn to scale.

Figure 5 shows the coated wire of the heating element 23 immediately after it has been surrounded by the ceramic slip 24 and before its coating 25 has had time to absorb any substantial quantity of moisture from the slip. The metal wire in this figure is designated by reference 16, whilst the position of the surface of contact between the coating 25 and the ceramic slip 24 is indicated by the circle 26. The effect of the absorption of moisture by the coating 25 from the ceramic slip 24 is shown in Figure 6. As can be seen in this figure, the coating 25 has expanded so that its circumference has moved outward from the position of circle 26, which in Figure 6 is shown chain-dotted, to that of the larger diameter circle 27, the cavity in the ceramic slip 24 in which the wire 16 is housed being thus correspondingly enlarged at the same time. During the subsequent drying operation, both the ceramic slip 24 and the coating 25 shrink as they lose moisture, so that their surface of contact moves inward from the position of circle 27 shown chain-dotted in Figure 7. The coating 25 reverts to its original diameter, i. e. so that its circumference coincides once again with circle 26 which is shown in Figure 7; the drying shrinkage in this case amounting to about 5%. When the ceramic slab with the embedded heating element is subjected to firing, the ceramic material 24 undergoes a further shrinkage of about 10% so that the walls of the cavity in which the wire is housed close in from the position indicated by the circle 26, to the position of circle 28, and simultaneously the wire 16 expands under the influence of the rise in temperature so that its circumference moves outward to the position of the circle 28. The above-described expansion of the wire 16 and simultaneous contraction of the walls of the cavity in the ceramic material 24 during firing is made possible by the fact that the coating 25 is almost completely burnt up and dispersed in the form of gas and/or vapour, leaving the necessary clearance to accommodate the said simultaneous expansion and contraction.

Finally, when firing has been completed and the slab has cooled to atmospheric temperature, there will be ample clearance between the circumference of the wire 16 and the surrounding wall of the cavity in the ceramic slab. This clearance is more than adequate to allow for the radial expansion of the heating wire 16 when the hot plate is in use.

The fact that the wire 16 is bent into undulating form as described with reference to Figures 1 and 2 before being embedded in the ceramic slip ensures that the wire can yield to compensate for the shrinkage of the ceramic material during drying and firing and its own expansion during firing.

While the invention has been described above as applied to the embedding of an electric heating element in a slab of ceramic material for the production of an electric hot-plate, it is to be understood that the invention is not limited to this particular application, but can be utilised with advantage in other applications, such as for the purpose of embedding inductive, capacitative or magnetic elements or structural reinforcing elements in other ceramic products.

I claim:

1. The method of making a ceramic body having a metallic element embedded therein, comprising coating the metallic element with a material capable of having its physical characteristics change to substantially reduce the thickness of such coating thereof during the heat treatment of the ceramic, embedding the coated metallic element in ceramic slip from which the ceramic body is to be formed, the coating on said embedded element engaging and forming a layer between such element and the ceramic slip and having a physical thickness substantially greater than in the final product, then drying and firing the composite mass to shrink the ceramic, to expand the metallic element and to reduce the physical thickness of said coating during such drying and firing operation, said coating being reduced in thickness to an extent as to enable the metallic element and the ceramic during such drying and firing operation to expand and to shrink, respectively, into the space created by the reduction in the physical thickness of said coating, without producing any substantial pressure effect between the metal element and the ceramic, and then cooling the composite mass to reduce the volume of the metallic element to a volume less than the volume defined by the ceramic wall enclosing said element and to enable the volume of such metallic element to be subsequently increased under heat without setting up stresses in the ceramic.

2. The method of making a ceramic body having a metallic element embedded therein, comprising coating the metallic element with a material capable of absorbing aqueous liquids and swelling at normal temperature and capable of having its physical characteristics change to substantially reduce the thickness of such coating thereof during the heat treatment of the ceramic, embedding the coated element in ceramic slip from which the ceramic body is to be formed, permitting the coating material to remain in contact with the moist ceramic slip for a sufficient period to enable such material to absorb moisture from the slip and to swell to an increased physical thickness to increase the volume of said coated element in the ceramic, then drying the composite mass to cause the ceramic and the coating material to shrink radially around the metallic element, then firing the composite mass to further shrink the ceramic, to expand the metallic element and to further reduce the physical thickness of said coating during such firing operation, said coating being reduced in thickness to an extent as to enable the metallic element and the ceramic during such firing operation to expand and to shrink, respectively, into the space created by the reduction in the physical thickness of said coating without producing any substantial pressure effect between the metal element and the ceramic, and then cooling the composite mass to reduce the volume of the metallic element to a volume less than the volume defined by the ceramic wall enclosing said element and to enable the volume of such metallic element to be subsequently increased under heat without setting up stresses in the ceramic.

3. The method of making a ceramic body having a metallic element embedded therein, comprising coating the metallic element with a material capable of volatizing at ceramic firing temperatures, embedding the coated metallic element in the ceramic slip from which the ceramic body is to be formed, the coating on said embedded element engaging and forming a layer between such element and the ceramic slip, then drying and firing the composite mass to shrink the ceramic, to expand the metal element and to volatize the material of said coating, the physical thickness of said coating material in its original non-volatized form providing sufficient volumetric space upon the volitization of such material to enable the metallic element and the ceramic to expand and to shrink respectively, without producing any substantial pressure effect between the metal element and the ceramic, and then cooling the composite mass to reduce the volume of the metallic element to a volume less than the volume defined by the ceramic wall enclosing said element and to enable the volume of such metallic element to be subsequently increased under heat without setting up stresses in the ceramic.

4. The method claimed in claim 1, wherein collodion is utilized as the main constituent of the coating applied to said element.

5. The method claimed in claim 1, wherein said coating material includes a protective substance which is substantially unaffected by the heat treatment of the ceramic and remains after such heat treatment as a non-adhesive layer between the metal element and the ceramic.

References Cited in the file of this patent

UNITED STATES PATENTS

| | | |
|---|---|---|
| 771,594 | Wilhelmi | Oct. 4, 1904 |
| 1,308,211 | Walder | July 1, 1919 |
| 1,531,308 | Rice et al. | Mar. 31, 1925 |
| 1,599,924 | Sanborn | Sept. 14, 1926 |
| 1,614,506 | Van Voorhis | Jan. 18, 1927 |
| 1,654,292 | Keene et al. | Dec. 27, 1927 |
| 1,767,586 | Hudson | June 24, 1930 |
| 2,106,578 | Schwartzwalder et al. | Jan. 25, 1938 |
| 2,175,672 | Scott | Oct. 10, 1939 |
| 2,363,329 | Horsfield | Nov. 21, 1944 |
| 2,477,121 | Ganci | July 26, 1949 |
| 2,535,100 | Sourwine | Dec. 26, 1950 |

FOREIGN PATENTS

| | | |
|---|---|---|
| 410,376 | Germany | Mar. 3, 1925 |